No. 696,882. Patented Apr. 1, 1902.
E. AHLBORN.
FLOODING REGENERATIVE HEATER FOR LIQUIDS.
(Application filed Dec. 20, 1901.)
(No Model.)
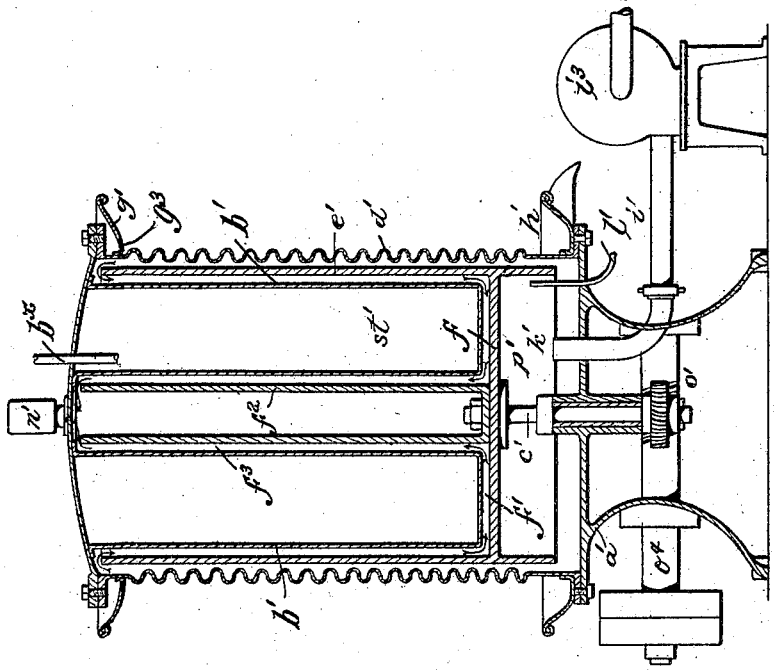
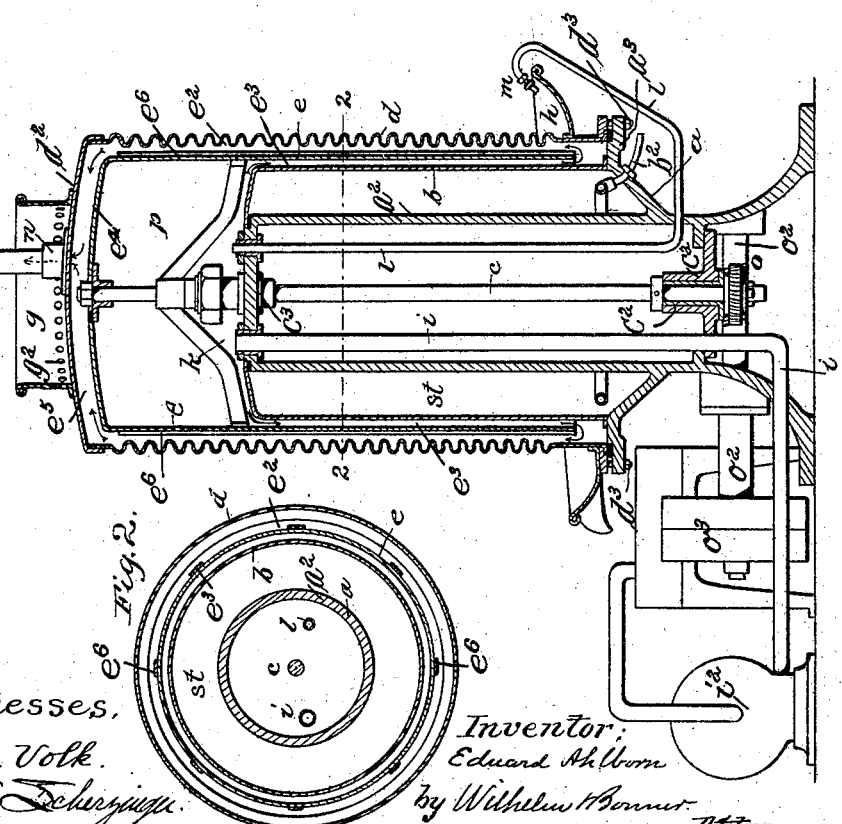

UNITED STATES PATENT OFFICE.

EDUARD AHLBORN, OF HILDESHEIM, GERMANY.

FLOODING REGENERATIVE HEATER FOR LIQUIDS.

SPECIFICATION forming part of Letters Patent No. 696,882, dated April 1, 1902.

Application filed December 20, 1901. Serial No. 86,627. (No model.)

*To all whom it may concern:*

Be it known that I, EDUARD AHLBORN, a subject of the Emperor of Germany, residing at Hildesheim, Germany, have invented certain new and useful Improvements in Liquid-Heaters, of which the following is a specification, reference being had therein to the accompanying drawings.

This invention relates to an apparatus for heating and cooling liquids in which a liquid-heating means and a heat-interchanging wall or partition are employed and means for causing the liquid to flow in opposite directions over or against the opposite faces of said wall or partition, whereby the hot liquid on one side gives up a part of its heat to the liquid on the other side and is cooled, while the cooler liquid is warmed.

The object of the invention is to provide an apparatus of this character which is simple in construction, is of large capacity compared with its size, and in which the maximum interchange of heat is possible, whereby the cost of operation of the apparatus is reduced.

A further object is to provide the heater with an air-chamber which affords an air-cushion which relieves the heater from the objectionable hard strokes of the feeding-pump.

A further object is to so construct the apparatus that the parts can be readily assembled and easy access can be had to the surfaces washed by the liquid being treated for cleaning the same.

The apparatus hereinafter described is especially adapted for sterilizing liquids, such as milk, which can be heated evenly and then again cooled before they leave the apparatus.

In the accompanying drawings, Figure 1 is a vertical sectional elevation of an apparatus embodying the invention. Fig. 2 is a horizontal section through the heater on line 2 2, Fig. 1. Fig. 3 is a vertical sectional elevation of a heater of slightly-modified construction.

Like letters of reference refer to like parts in the several figures.

Referring particularly to Figs. 1 and 2, $a$ represents the base of the heater, which, as shown, is provided with an upright cylindrical portion $a^2$, and at or near the base of this upright portion with an outwardly-extending annular flange $a^3$. $b$ represents a cylindrical shell which at its upper end is provided with an inwardly-extending top wall which is secured to the upper end of the upright portion or standard $a^2$. At its lower end the shell rests on and is secured to the outwardly-extending flange $a^3$ of the base. The cylindrical upright portion of the base and the shell $b$ thus form an annular steam or heating chamber $st$. $b^2$ represents a pipe for supplying steam or other heating medium to the steam-chamber. $d$ represents an outer or inclosing casing which surrounds the steam-chamber and is spaced therefrom. The inclosing casing is provided with a top $d^2$, which is preferably convexed, and an upright circular wall which is concentric with the steam-chamber and rests at its lower end upon the outer portion of the flange $a^3$ of the base, to which it is secured, preferably detachably, by suitable means, such as bolts or the like $d^3$. The circular upright wall of the inclosing casing constitutes a heat-interchanging wall or partition, over the outer and inner surfaces of which the liquid to be treated is caused to flow. In order to retard the flow of the liquid and to give an extended or large area for the interchanging of heat between the flowing liquid on the opposite sides of the wall, the latter is preferably formed with horizontal corrugations or bends, as shown in the drawings. The size and number of these corrugations may be changed to suit the conditions of the liquid being treated and size of the apparatus, so as to give a greater or less flow-surface. $g$ represents a distributing vessel or receptacle which is supported centrally on the top of the inclosing casing and is provided around the lower portion of its upright wall with a series of evenly-distributed holes $g^2$, through which the liquid to be treated, which is supplied to the distributing-receptacle, discharges on the top of the inclosing casing, so as to flow in a thin film or sheet from the top down over the outer surface of the corrugated heat-interchanging wall. $h$ represents an annular trough or the like secured to and surrounding the lower portion of the heat-interchanging wall, so as to catch the liquid flowing down the outer surface thereof. $e$ represents a rotary drum which is provided with an upright circular wall which surrounds the annular steam-chamber between the same and the heat-interchanging wall. The circular wall of the drum is spaced from both the steam-chamber and the heat-interchanging wall, thus providing an outer annular flow-space $e^2$ between the drum and heat-interchanging wall and an inner annular flow-space $e^3$ between the steam-chamber and the drum. These spaces communicate beneath the lower end of the circular wall of the drum. The drum is closed at its upper end by a head or top $e^4$, which divides the space between the top of the steam-chamber and the top of the inclosing casing into a flow-space $e^5$ for the liquid, which connects with the outer annular space $e^2$ and an air-compressing chamber $p$ between the top of the steam-chamber and the top of the drum. The drum is supported and rotated by any suitable or preferred instrumentalities. In the construction shown in Fig. 1 the drum is secured to the upper end of a vertical spindle or shaft $c$, which is journaled at its lower end in a bearing $c^2$, secured to the base of the heater, and at its upper end in a bearing $c^3$ in the top of the upright portion of the base. Preferably the drum is detachably secured to the shaft in any suitable manner, so that when the inclosing casing is removed from the base the drum can be readily disengaged from the shaft and removed from over the steam-chamber, so that the outer surface of the latter and the inner surface of the drum can be cleaned. The shaft is driven, for instance, by a worm-wheel $o$, which is secured to its lower end beneath the lower shaft-bearing and which meshes with a worm on a drive-shaft $o^2$, which is mounted in suitable bearings on the base and is provided with a suitable drive pulley or pulleys $o^3$. $i^2$ represents a pump of any suitable form which supplies the liquid to be treated to the air-compressing chamber $p$, between the head of the rotary drum and the top of the steam-chamber, by a pipe $i$, which extends up through the upright central portion of the base and has an open upper end which leads into the air-compressing chamber. In the apparatus shown in Fig. 1 the pump takes the liquid from the annular trough $h$ or a tank into which the trough discharges. Air is confined and compressed in the compressing-chamber by the liquid pumped thereinto, so as to afford an air-cushion for relieving the apparatus from the hard thrusts of the pump in case the latter is not provided with an air-chamber. $l$ represents a pipe which leads from the air-compressing chamber $p$ to the outside of the machine and is provided with a tap $m$ for regulating the air contents of the chamber $p$. Preferably, as shown, the outer end of the pipe is directed into the annular catching-trough $h$. $n$ represents an exit-pipe which leads from the flow-space $e^5$. The heated liquid passes out of the apparatus through this pipe. The liquid to be heated or sterilized is supplied to the distributing-receptacle $g$ on top of the outer or inclosing casing and from this receptacle flows in a thin film or sheet, which is evenly distributed, down over the outer surface of the heat-interchanging wall into the annular trough $h$ at the bottom of the same. The liquid which is collected in the trough is forced by the pump through the pipe $i$ into the air-compressing chamber $p$ in the top of the rotating drum, from which it passes over the top of the steam-chamber into the annular space between the latter and the rotating drum. The air-pressure in the air-chamber $p$ and the centrifugal action force the liquid down through this annular space around the open lower end of the rotating drum and up through the outer annular space between the drum and the heat-interchanging wall of the inclosing casing. The liquid is caused to rise slowly in this outer annular space until it reaches the horizontal space $e^5$ between the head of the rotating drum and the top of the inclosing casing, from which space it passes from the heater through the pipe $n$. The rapidly-rotating drum, by reason of the friction between the same and the liquid, causes the liquid on the one side thereof to rotate with the drum against the outer wall of the steam-chamber, so that it is evenly heated to the desired temperature, while on the other side the liquid rotates against the inner surface of the corrugated heat-interchanging wall, to which and the cold liquid flowing down the outer surface of the heat-interchanging wall it gives up a large proportion of its heat. To compel the rotation of the liquid in the outer annular space, the outer face of the drum is preferably provided with wings or ribs $e^6$. The rapid rotation of the drum causes the liquid in the outer annular space between the drum and the heat-interchanging wall to make a long helical ascent. The friction of the liquid on the inner surface of the heat-interchanging wall causes the parts of the liquid to be constantly whirled among one another, so that all parts of the liquid in this space come into intimate contact with the heat-interchanging surface and throw off their heat. At the same time the rapid rotation of the liquid caused by the rotating drum prevents the layers of different temperature, which arrange themselves one on the other, from mixing of their own accord, as would be the case if these superposed layers were at rest with the warmer layers below. The interchange of heat between the warm liquid rising on the inner surface of the heat-interchanging wall and the cold liquid flowing down the outer surface is very complete, and practically two-thirds of the calories of the warmer liquid is absorbed by the cold liquid, so that the heat required to be supplied to the steam-chamber for heating the liquid is greatly reduced and the economy in steam or other heating medium is very considerable. It will be observed that the rotating drum does not constitute the heat-interchanging surface, but that it serves to isolate the columns of liquid between the same and the steam-heating chamber and between the drum and the heat-interchanging surface, whereby a much greater interchange of heat is possible than if the drum itself constituted the heat-interchanging wall.

The described construction enables the outer casing to be readily detached from the base and removed, so that the outer face of the rotating drum over which the liquid flows can be cleaned, and also this rotating drum itself can be removed from over the steam-chamber and the latter, as well as the inside of the drum, cleaned.

In Fig. 3 is shown an apparatus operating on the same principle as that above described, but in which the construction is slightly modified to enable a reverse movement of the liquid, in which the cold liquid is first introduced into the interior of the machine and moves upwardly along the inner surface of the heat-interchanging wall, where it is preliminarily heated by the hot liquid, which passes out from the heater and flows downwardly over the outer surface of the heat-interchanging wall. In this construction, $a'$ represents the base; $d'$, the circular corrugated heat-interchanging wall; $b'$, the shell forming the steam or heating chamber, which is annular in form and is suspended from the top of the inclosing casing, being concentric with and spaced from the circular wall thereof. The heating medium is supplied to the steam-chamber by a pipe $b^\times$. $e'$ represents the rotating drum, which is provided near its lower end with a head or horizontal partition $f$, which divides the space between the top of the base and the bottom of the steam-chamber into a flow-space $f'$ above the head for the liquid and an air-compressing chamber $p'$ beneath the head. The circular wall of the drum extends up between the steam-chamber and inclosing casing, forming the inner and outer flow spaces, which communicate, respectively, with the horizontal space $f'$ and the air-compressing chamber $p'$. The drum is carried by the upper end of the shaft $c'$, which is mounted in a suitable bearing in the base and is driven by gearing $o'$, connecting its lower end with the drive-shaft $o^4$. Secured centrally to the upper side of the drumhead $f$ is an upright tube or cylinder $f^2$, which extends up into the central space formed by the inner wall of the annular steam-chamber. The tube or cylinder is spaced from the inner wall of the steam or heating chamber, so as to provide an annular space $f^3$ for the liquid, which communicates with the horizontal space $f'$ between the head $f$ and the bottom wall of the steam-chamber. $i^3$ represents the supply-pump or other means for supplying the liquid to the heater. The liquid enters the air-compressing chamber $p'$ by a pipe $i'$, leading from the pump. $l'$ represents the pipe leading from the air-compressing chamber $p'$ outside of the machine and which, like the pipe $l$, is provided with a tap (not shown) for regulating the air contents of the air-chamber. $n'$ represents the valve through which the heated liquid finds its exit from the heater. $g'$ represents an annular trough which surrounds the upper end of the heat-interchanging wall, so as to catch the liquid flowing from the top of the inclosing casing and distribute the same through perforations $g^3$ in its inner part to the heat-interchanging wall, and $h'$ the annular trough into which the liquid flows from the heat-interchanging wall and is collected to be conveyed away as desired.

In the machine of the construction shown in Fig. 3 the liquid to be heated or sterilized is introduced by the pipe $i'$ in the first instance into the air-compressing chamber $p'$, from which it is caused by the centrifugal action and the pressure of the air in said chamber to flow beneath the lower end of the cylindrical wall of the drum and rise in a long helical or spiral course in the annular flow-space between the rotating drum and the heat-interchanging wall. The liquid passes from this outer annular space over the upper end of the circular wall of the drum into the annular space between the rotating drum and the annular steam-chamber, thence through the horizontal space $f'$ between the lower end of the steam-chamber and the partition or head $f$ of the drum, upwardly through the inner annular space formed between the inner wall of the steam-chamber and the central tube or cylinder $f^2$, from the upper end of which space the liquid passes to the outside of the machine through the valve $n'$. The liquid is heated to the desired temperature in passing over the outer and inner walls of the steam-heating chamber, and the heated liquid flows from the valve $n'$ in a thin film or sheet over the top of the inclosing casing into the annular distributing receptacle or trough $g'$, from which it passes through the perforations $g^3$ down over the outer surface of the corrugated heat-interchanging wall into the catch basin or trough $h'$. Thus it will be seen that the cold liquid flows upwardly on the inner side of the heat-interchanging wall and the hot liquid flows downwardly over the outer surface thereof, so that a very complete interchange of heat is accomplished. The principle of operation of the machine shown in Fig. 3 is the same as that shown in Figs. 1 and 2. The upright walls of the steam chamber, drum, and inclosing casing are shown as cylindrical; but it is manifest that they may be made conical.

I claim as my invention—

1. The combination with a heating-chamber, of a casing inclosing the same and spaced therefrom, a rotating drum having a circular wall arranged between said inclosing casing and said heating-chamber and spaced from both, means for causing the liquid to be treated to pass through said spaces between the heating-chamber and the drum and the inclosing casing and the drum, and means for causing the liquid to flow over the outer surface of the inclosing casing, substantially as set forth.

2. The combination of a steam heating-chamber, a rotating drum surrounding the same and spaced therefrom, an inclosing casing surrounding the drum and spaced therefrom, an air-chamber formed by said rotating drum and means for introducing the liquid to be treated into said air-chamber, substantially as set forth.

3. The combination of a heating-chamber, a rotating drum surrounding the same and spaced therefrom so as to provide a space for the liquid to be treated, said drum having a head which forms beneath the same an air-compressing chamber, an inclosing casing surrounding said drum and separated therefrom by a space for the liquid, means for introducing the liquid into said air-compressing chamber, and means for distributing the liquid to be treated over the outer surface of the inclosing casing, substantially as set forth.

4. The combination of a base, a heating-chamber supported thereby, a rotating drum surrounding said heating-chamber and spaced therefrom, said drum having a head which is spaced from the top of said heating-chamber and forms therewith an air-compressing chamber, an inclosing casing surrounding said drum and spaced therefrom, means for introducing the liquid to be treated into said air-compressing chamber, and a distributing-receptacle supported by said inclosing casing and which distributes the liquid to be treated over the outer surface of said inclosing casing, substantially as set forth.

5. The combination of a heating-chamber, a rotating drum surrounding the same and spaced therefrom, an inclosing casing surrounding said drum and spaced therefrom, said casing being provided with a corrugated circular wall, means for causing the liquid to pass through said spaces between the heating-chamber and the drum and between the inclosing casing and the drum, and means for causing the liquid to flow over the outer surface of said corrugated circular wall of the inclosing casing, substantially as set forth.

6. The combination of a heating-chamber having a cylindrical outer wall, a cylindrical drum inclosing said heating-chamber and spaced therefrom, means for rotating said drum, and an outer or inclosing chamber surrounding said rotating drum and spaced therefrom, said inclosing casing having a corrugated circular wall, means for introducing liquid to be treated into the space between said heating-chamber and the rotating drum and between the inclosing casing and the rotating drum, a distributing vessel supported by the upper part of said supporting-casing for distributing the liquid over the outer surface of said corrugated circular wall, and an annular trough surrounding the lower portion of the corrugated wall of said inclosing casing, substantially as set forth.

In testimony that I claim the foregoing as my invention I have signed my name in presence of two subscribing witnesses.

EDUARD AHLBORN.

Witnesses:
LEONORE RASCH,
C. C. STEVENSON.